US009367731B2

(12) United States Patent
Vodrahalli

(10) Patent No.: US 9,367,731 B2
(45) Date of Patent: Jun. 14, 2016

(54) DEPTH GRADIENT BASED TRACKING

(75) Inventor: Kiran N. Vodrahalli, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 13/977,022

(22) PCT Filed: May 23, 2012

(86) PCT No.: PCT/US2012/039048
§ 371 (c)(1),
(2), (4) Date: Jun. 28, 2013

(87) PCT Pub. No.: WO2013/176660
PCT Pub. Date: Nov. 28, 2013

(65) Prior Publication Data
US 2015/0193655 A1  Jul. 9, 2015

(51) Int. Cl.
G06K 9/00       (2006.01)
H04N 5/222      (2006.01)
G06T 7/00       (2006.01)
G06K 9/62       (2006.01)
G06T 7/20       (2006.01)

(52) U.S. Cl.
CPC ........ G06K 9/00355 (2013.01); G06K 9/00389 (2013.01); G06K 9/6277 (2013.01); G06T 7/0081 (2013.01); G06T 7/0083 (2013.01); G06T 7/0097 (2013.01); G06T 7/2066 (2013.01); H04N 5/2226 (2013.01); *G06T 2200/28* (2013.01); *G06T 2207/10016* (2013.01); *G06T 2207/10028* (2013.01); *G06T 2207/20148* (2013.01); *G06T 2207/30196* (2013.01); *G06T 2207/30241* (2013.01)

(58) Field of Classification Search
CPC ..................................... G06K 9/00; G06T 7/00
USPC .................................................. 382/103, 154
See application file for complete search history.

(56) References Cited

U.S. PATENT DOCUMENTS

2008/0212836 A1    9/2008  Fujimura et al.
2010/0111358 A1*   5/2010  Chai et al. ..................... 382/103

(Continued)

FOREIGN PATENT DOCUMENTS

KR    10-0544677 B1    1/2006

OTHER PUBLICATIONS

International Search Report and Written Opinion received for PCT application No. PCT/US2012/039048, mailed on Jan. 17, 2013, 9 pages.
International Preliminary Report on Patentability received for PCT Patent Application No. PCT/US2012/039048, mailed on Dec. 4, 2014, 6 pages.

(Continued)

*Primary Examiner* — Stephen R Koziol
*Assistant Examiner* — Delomia L Gilliard
(74) *Attorney, Agent, or Firm* — Jordan IP Law, LLC

(57) ABSTRACT

Systems and methods may provide for determining depth gradient information based on a depth map of a scene, and determining a threshold parameter. Additionally, a hand may be identified in the scene based on the depth gradient information and the threshold parameter. Moreover, motion information such as time-based, color-based and/or frame-based information can be used to track hand gestures in the scene.

28 Claims, 5 Drawing Sheets

(56) References Cited

U.S. PATENT DOCUMENTS

| | | | |
|---|---|---|---|
| 2011/0293137 A1 | 12/2011 | Gurman et al. | |
| 2011/0299774 A1 | 12/2011 | Manders et al. | |
| 2012/0056982 A1 | 3/2012 | Katz et al. | |
| 2012/0194517 A1* | 8/2012 | Izadi et al. | 345/420 |
| 2012/0309517 A1* | 12/2012 | Al-Ghosien et al. | 463/31 |
| 2013/0182943 A1* | 7/2013 | Tsai | 382/154 |

OTHER PUBLICATIONS

Office Action received for Taiwan Patent Application No. 102116214, dated on Nov. 24, 2014, 11 pages including 5 pages of English translation.

Extended European Search Report for European Patent Application No. 12877091.4, mailed on Mar. 2, 2016, 10 pages.

* cited by examiner

FIG. 1A
FIG. 1B
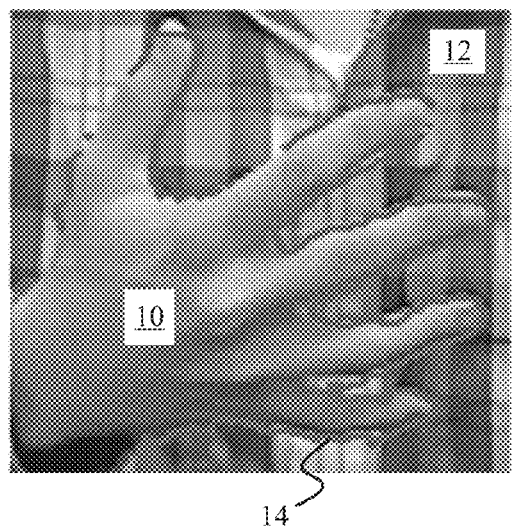
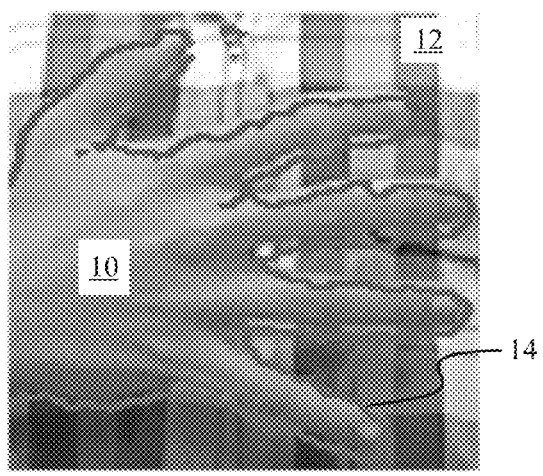
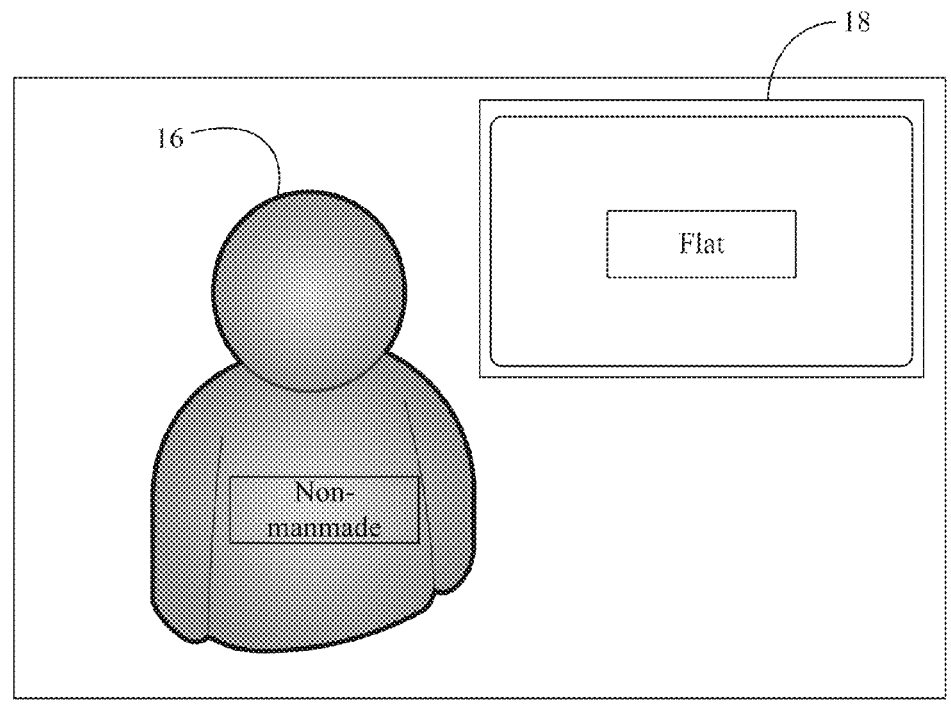
FIG. 2

DEPTH GRADIENT BASED TRACKING

BACKGROUND

Embodiments generally relate to perceptual computing. More particularly, embodiments relate to the use of depth gradient information to conduct computer-based hand tracking.

Hand tracking may be useful for a wide variety of human-computer interactions, although the high complexity of the hand can present challenges with regard to fidelity issues and/or model imperfections.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 1A and 1B are images of an example of a hand tracking outline according to an embodiment;

FIG. 2 is an illustration of an example of an object classification according to an embodiment;

DETAILED DESCRIPTION

Figure 3:
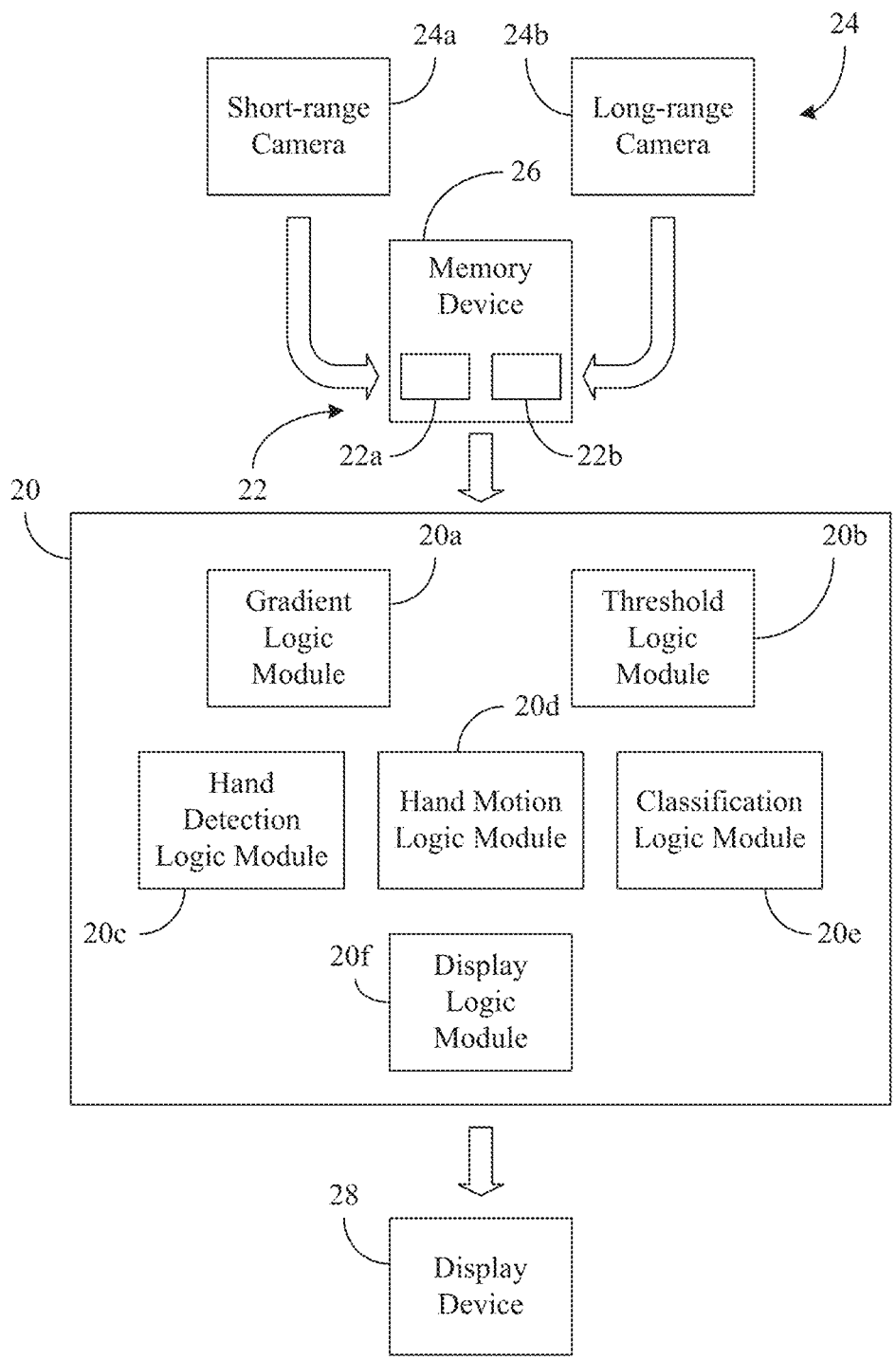
FIG. 3 is a block diagram of an example of a logic architecture according to an embodiment.

Turning now to FIGS. 1A and 1B, a scene is shown in which a human hand 10 is positioned in front of a shirt 12 at two different locations and different orientations. In the illustrated example, perceptual computing techniques are used to identify the hand 10 and track its gestures in real-time. Moreover, an outline 14 of the hand 10 may be automatically generated in the image of the scene, wherein the image and a corresponding depth map could be captured via a depth camera such as a time-of-flight camera, structured light camera, stereoscopic camera, and so forth. The depth camera may be a short-range camera (e.g., viewing distance less than approximately one foot) having a relatively high resolution or a long-range camera (e.g., viewing distance greater than approximately two feet) having a relatively low resolution. As will be discussed in greater detail, a short-range camera may be more suitable for the illustrated hand tracking application, whereas a long-range camera may be particularly useful to classify objects in larger scenes and/or environments.

FIG. 2 shows a scene in which an individual 16 is automatically classified as having "non-manmade" surfaces, whereas an object such as a television 18 mounted on a wall is automatically classified as having flat surfaces. As in the earlier example, the image of the scene could be captured by an appropriate depth camera, depending upon the circumstances, wherein the depth camera is a long-range camera in one example. By choosing an appropriate gradient threshold, parallel lines may appear on the surfaces of the television 18, after which they can be detected by one or more well documented approaches such as the Hough transform-style technique. The illustrated individual 16 and television 18 have been marked with their respective classifications, although outlines of the individual 16 and television 18 could also be generated and added to the image of the scene on a real-time basis.

The solutions of FIGS. 1A, 1B and 2 may also be combined to provide both high resolution hand tracking and low resolution object classification in the same architecture. Such an approach may be particularly useful in gaming and other human-computer interaction applications. Indeed, the illustrated approaches may be used to recognize sign language gestures, gaming gestures (e.g., pointing at virtual and/or actual objects, holding up a certain number of fingers, etc.), as well as to recognize specific types of settings and/or environments (e.g., large groups versus individual players, indoors versus outdoors, etc.).

Turning now to FIG. 3, a logic architecture 20 (20a-20f) is shown in which one or more depth cameras 24 (24a, 24b) capture images and generate depth maps 22 (22a, 22b) for a scene and store the depth maps 22 to a memory device 26. The logic architecture 20 may be generally incorporated into a mobile platform such as a laptop computer, personal digital assistant (PDA), wireless smart phone, media player, imaging device, mobile Internet device (MID), any smart device such as a smart phone, smart tablet and so forth, or any combination thereof. The logic architecture 20 may also be part of a fixed platform such as a personal computer (PC), smart TV, server, workstation, etc.

The illustrated logic architecture 20 includes a gradient logic module 20a that determines depth gradient information based on the depth maps 22, and a threshold logic module 20b that determines threshold parameters, wherein a hand detection logic module 20c and a classification logic module 20e can use the depth gradient information and threshold parameters to identify hands and/or classify objects, respectively, in the scene. Moreover, a hand motion logic module 20d may determine motion information (e.g., time-based, color-based, frame-based, etc.) for the hand and track hand gestures in the scene based on the motion information. The illustrated logic architecture 20 also includes a display logic module 20f that interfaces with a display device 28 in order to visually output the images of the scene, as well as the object outlines and/or classification markings.

Figure 4:
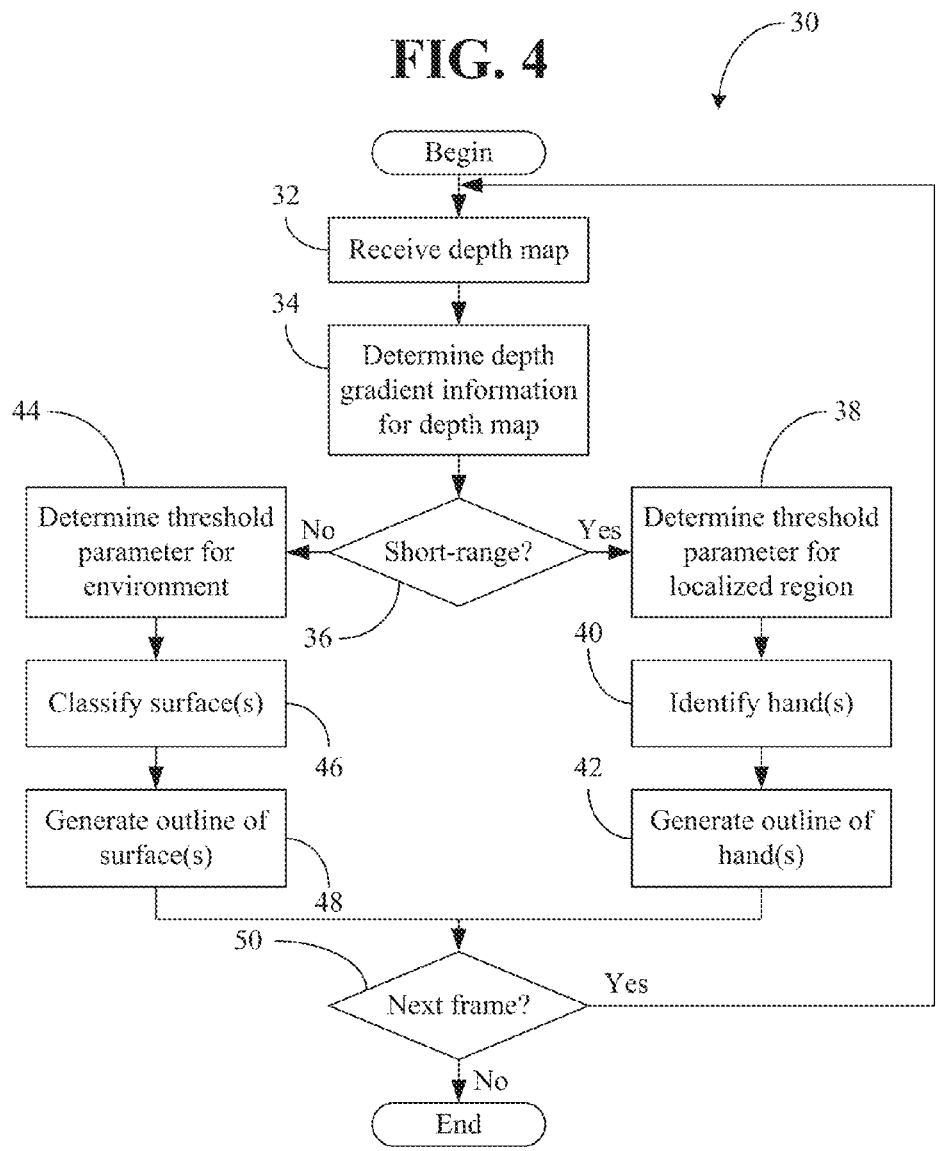
FIG. 4 is a flowchart of an example of a method of conducting perceptual computing according to an embodiment.

Turning now to FIG. 4, a method 30 of conducting perceptual computing is shown. The method 30 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 30 may be written in any combination of one or more programming languages, including an object oriented programming language such as C++ or the like and conventional procedural programming languages, such as the "C" programming language or similar programming languages. Moreover, the method 30 could be implemented using any of the aforementioned circuit technologies.

Illustrated processing block 32 provides for receiving a depth map, wherein depth gradient information may be deter mined for the depth map at block 34. One expression for the depth gradient determination may be given by, $$G(x,y)=\sqrt{(D(x,y)-D(x-1,y))^2+(D(x,y)-D(x,y-1))^2}$$

Where G(x,y) is the depth gradient at pixel location x,y and D(x,y) is the depth at pixel location x,y. Other expressions and approaches may also be used. For example, larger pixel neighborhoods, diagonal pixels, etc., could be incorporated into the depth gradient determination on a fixed or variable basis. If it is determined at block 36 that the depth map originated from a short-range camera, block 38 may determine a threshold parameter for a localized region in the scene. One or more hands can be identified in the scene at block 40 by comparing the depth gradient information to the threshold parameter. For example, if the depth gradient at a particular location exceeds the threshold parameter, block 40 may infer that the location in question represents an outer edge of a hand such as the hand 10 (FIGS. 1A and 1B), as already discussed. Accordingly, illustrated block 42 generates an outline of the hand and may conduct noise (e.g., black and white specs) reduction as needed. Pseudo code for the illustrated approach may therefore be provided as follows, Get depth values
Calculate gradients G(x,y)
For all (x,y), such that depth<background, if G(x,y) >threshold parameter, display grey pixel and write grey pixels to an array
Consider non-grey pixels and grey-pixels as zero and one, respectively
Salt-and-pepper noise removal based upon above assumption
For each grey pixel, color all adjacent pixels grey as well If it is determined at block 36 that the depth camera is a long-range camera, on the other hand, block 44 may determine a threshold parameter for a larger environment reflected in the scene. Thus, block 44 could take into consideration the resolution and/or viewing range of the camera (e.g., source of the depth map), wherein illustrated block 46 classifies one or more surfaces in the scene based on the depth gradient information and the second threshold parameter. For example, block 46 might detect that a surface has a very low depth gradient and therefore classify the surface as a flat surface. Alternatively, block 46 may detect that a surface does not have a very low depth gradient and therefore classify the surface as belonging to a non-manmade object. In this regard, a generalization could be made that manmade objects (e.g., tables, computers, doors, chairs, etc.) tend to have sharp angles, flat surfaces and uniformity. Accordingly, if the depth gradient is not very low, an assumption may be made that the object in question lacks sharp angles, flat surfaces and/or uniformity, and is therefore a non-manmade object (e.g., human, animal, etc.). Illustrated block 48 generates an outline or otherwise labels the classified surfaces. If it is determined at block 50 that additional frames are available for processing (e.g., video capture application), the illustrated method 30 may be repeated on a frame-by-frame basis.

Figure 5:
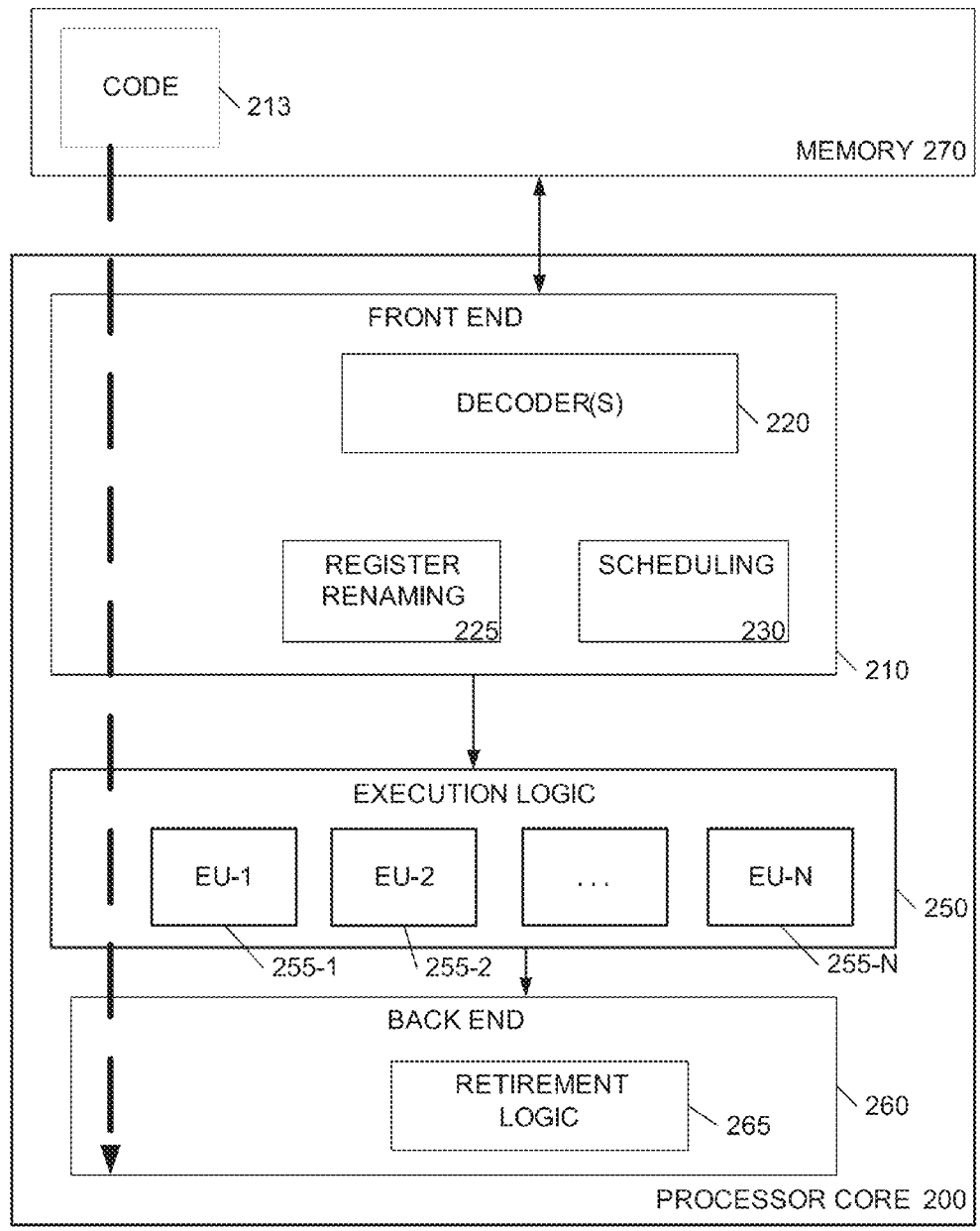
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 20 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
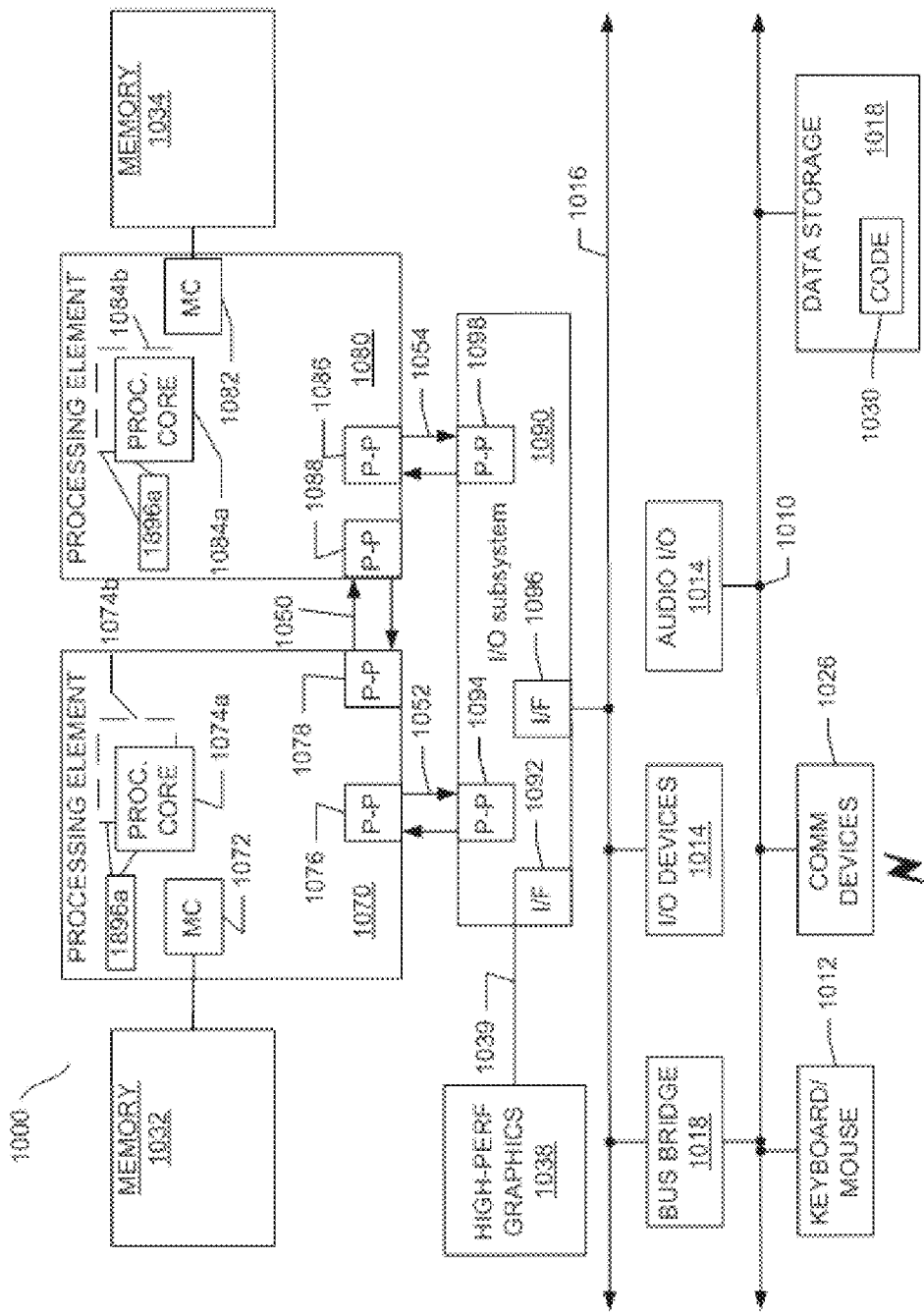
FIG. 6 is a block diagram of an example of a system according to an embodiment.

Referring now to FIG. 6, shown is a block diagram of a system embodiment 1000 in accordance with an embodiment of the present invention. Shown in FIG. 6 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074, 1074b,

1084a, 1084b may be configured to execute instruction code in a manner similar to that discussed above in connection with FIG. 5.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 6. MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 6, various I/O devices 1014 such as the cameras 24 (FIG. 3) and/or display device 28 (FIG. 3) may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network 503), and a data storage unit 1018 such as a disk drive or other mass storage device which may include code 1030, in one embodiment. The code 1030 may include instructions for performing embodiments of one or more of the methods described above. Thus, the illustrated code 1030 may implement the logic architecture 20 (FIG. 3) and could be similar to the code 213 (FIG. 5), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Embodiments may include an apparatus having a gradient logic module to determine a first set of depth gradient information based on a first depth map, and a threshold logic module to determine a first threshold parameter. The apparatus may also include a hand detection logic module to identify a hand based on the first set of depth gradient information and the first threshold parameter.

Additionally, the apparatus may further include a display logic module to generate an outline of the hand in an image of a scene containing the hand.

Moreover, the apparatus may further include a hand motion logic module to determine motion information for the hand and track one or more hand gestures based on the motion information.

In addition, the gradient logic module may obtain the first depth map from a memory location associated with a short-range camera.

In addition, the gradient logic module of the apparatus may determine a second set of depth gradient information based on a second depth map and the threshold logic module may determine a second threshold parameter, wherein the apparatus further includes a classification logic module to classify a surface based on the second set of depth gradient information and the second threshold parameter.

Moreover, the classification logic may classify the surface as flat.

Additionally, the classification logic may classify the surface as non-manmade.

Additionally, the gradient logic module may obtain the second depth map from a memory location associated with a long-range camera.

Embodiments may also include at least one computer-readable medium having one or more instructions that when executed on a processor configure the processor to determine a first set of depth gradient information based on a first depth map. The one or more instructions can also configure the processor to determine a first threshold parameter, and identify a hand based on the first set of depth gradient information and the first threshold parameter.

Additionally, the one or more instructions may configure a processor to generate an outline of the hand in an image of a scene containing the hand.

Moreover, the one more instructions may configure a processor to determine motion information for the hand, and track one or more hand gestures based on the motion information.

In addition, the one or more instructions may configure a processor to obtain the first depth map from a memory location associated with a short-range camera.

In addition, the one or more instructions may configure a processor to determine a second set of depth gradient information based on a second depth map, determine a second threshold parameter, and classify a surface based on the second set of depth gradient information and the second threshold parameter.

Moreover, the one or more instructions may configure a processor to classify the surface as flat.

Additionally, the one or more instructions may configure a processor to classify the surface as non-manmade.

Additionally, the one or more instructions may configure a processor to obtain the second depth map from a memory location associated with a long-range camera.

Embodiments can also include a system having a memory device to store a first depth map, and a gradient logic module to determine a first set of depth gradient information based on the first depth map. The system may also include a threshold logic module to determine a first threshold parameter, a hand detection logic module to identify a hand based on the first set of depth gradient information and the first threshold parameter, and a display device to output an image of a scene containing the hand.

Moreover, the system may further include a display logic module to generate an outline of the hand in the image.

In addition, the system may further include a hand motion logic module to determine motion information for the hand and track one or more hand gestures based on the motion information.

In addition, the system may further include a short-range camera, wherein the gradient logic module is to obtain the first depth map from a memory location associated with the short-range camera.

Moreover, the gradient logic module of the system may determine a second set of depth gradient information based on a second depth map and the threshold logic module may determine a second threshold parameter, wherein the apparatus further includes a classification logic module to classify a surface based on the second set of depth gradient information and the second threshold parameter.

Additionally, the classification logic module may classify the surface as flat.

Additionally, the classification logic module may classify the surface as non-manmade.

Moreover, the system may further include a long-range camera, wherein the gradient logic module is to obtain the second depth map from a memory location associated with the long-range camera.

Embodiments may also include a method in which a first set of depth gradient information is determined based on a first depth map, and a first threshold parameter is determined. The method may also provide for determining a second set of depth gradient information based on a second depth map, and determining a second threshold parameter. A hand can be identified based on the first set of depth gradient information and the first threshold parameter. Moreover, a surface may be classified based on the second set of depth gradient information and the second threshold parameter. The method can also provide for determining motion information for the hand, tracking one or more hand gestures based on the motion information, and generating an outline of the hand and the surface in one or more images of a scene containing the hand and the surface.

In addition, the surface may be classified as flat.

In addition, the surface may be classified as non-manmade.

Moreover, the method may further include obtaining the first depth map from a memory location associated with a short-range camera, and obtaining the second depth map from a memory location associated with a long-range camera.

Techniques described herein may therefore provide for tracking hand gestures in real-time using a short-range depth camera to obtain depth information. In particular, the greater complexities of the hand (e.g., relative to the body skeleton) may be obviated through the use of depth gradient information. For example, the depth gradient information can make it considerably easier to determine the presence and shape of objects, particularly when those objects have the intricacies and person-to-person variability of the human hand. Additionally, the techniques can be extended to long-range depth cameras in order to obtain information about an environment. Moreover, the techniques may be combined with depth information in order to perform object segmentation (e.g., detect a television against a wall), and layered on top of color-based and time-based tracking to provide improved performance with negligible additional overhead.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:
1. A method comprising:
  determining a first set of depth gradient information based on a first depth map;
  determining a first threshold parameter corresponding to a first depth gradient value;
  determining a second set of depth gradient information based on a second depth map;
  determining a second threshold parameter corresponding to a second depth gradient value;
  identifying a hand based on the first set of depth gradient information and the first threshold parameter;
  classifying a surface based on the second set of depth gradient information and the second threshold parameter;
  determining motion information for the hand;
  tracking one or more hand gestures based on the motion information; and
  generating an outline of the hand and the surface in one or more images of a scene containing the hand and the surface.
2. The method of claim 1, wherein the surface is classified as flat.
3. The method of claim 1, wherein the surface is classified as non-manmade.
4. The method of claim 1, further including:
  obtaining the first depth map from a memory location associated with a short-range camera; and
  obtaining the second depth map from a memory location associated with a long-range camera.
5. A system comprising:
  a memory device to store a first depth map;
  a gradient logic circuit to determine a first set of depth gradient information based on the first depth map;
  a threshold logic circuit to determine a first threshold parameter corresponding to a first depth gradient value;
  a hand detection logic circuit to identify a hand based on the first set of depth gradient information and the first threshold parameter; and
  a display device to output an image of a scene containing the hand.
6. The system of claim 5, further including a display logic circuit to generate an outline of the hand in the image.
7. The system of claim 5, further including a hand motion logic circuit to determine motion information for the hand and track one or more hand gestures based on the motion information.

8. The system of claim 5, further including a short-range camera, wherein the gradient logic circuit is to obtain the first depth map from a memory location associated with the short-range camera.

9. The system of claim 5, wherein the gradient logic circuit is to determine a second set of depth gradient information based on a second depth map and the threshold logic circuit is to determine a second threshold parameter corresponding to a second depth gradient value, the system further including a classification logic to classify a surface based on the second set of depth gradient information.

10. The system of claim 9, further including a display logic circuit to generate an outline of the surface, wherein the classification logic circuit is to classify the surface as flat.

11. The system of claim 9, wherein the classification logic circuit is to classify the surface as non-manmade.

12. The system of claim 9, further including a short range camera and a long-range camera, wherein the gradient logic circuit is to obtain the first depth map from a memory location associated with the short range camera and the second depth map from a memory location associated with the long-range camera.

13. An apparatus comprising:
    a gradient logic circuit to determine a first set of depth gradient information based on a first depth map;
    a threshold logic circuit to determine a first threshold parameter corresponding to a first depth gradient value; and
    a hand detection logic circuit to identify a hand based on the first set of depth gradient information and the first threshold parameter.

14. The apparatus of claim 13, further including a display logic circuit to generate an outline of the hand in an image of a scene containing the hand.

15. The apparatus of claim 13, further including a hand motion logic circuit to determine motion information for the hand and track one or more hand gestures based on the motion information.

16. The apparatus of claim 13, wherein the gradient logic circuit is to obtain the first depth map from a memory location associated with a short-range camera.

17. The apparatus of claim 13, wherein the gradient logic circuit is to determine a second set of depth gradient information based on a second depth map and the threshold logic circuit is to determine a second threshold parameter corresponding to a second depth gradient, the apparatus further including a classification logic circuit to classify a surface based on the second set of depth gradient information and the second threshold parameter.

18. The apparatus of claim 17, further including a display logic circuit to generate an outline of the surface, wherein the classification logic circuit is to classify the surface as flat.

19. The apparatus of claim 17, wherein the classification logic circuit is to classify the surface as non-manmade.

20. The apparatus of claim 17, wherein the gradient logic circuit is to obtain the first depth map from a memory location associated with a short-range camera and the second depth map from a memory location associated with a long-range camera.

21. At least one non-transitory computer-readable medium comprising one or more instructions that when executed on a processor configure the processor to:
    determine a first set of depth gradient information based on a first depth map;
    determine a first threshold parameter corresponding to a first depth gradient value; and
    identify a hand based on the first set of depth gradient information and the first threshold parameter.

22. The at least one non-transitory computer-readable medium of claim 1, wherein the one or more instructions are to configure a processor to generate an outline of the hand in an image of a scene containing the hand.

23. The at least one non-transitory computer-readable medium of claim 21, wherein the one or more instructions are to configure a processor to:
    determine motion information for the hand; and
    track one or more hand gestures based on the motion information.

24. The at least one non-transitory computer-readable medium of claim 21, wherein the one or more instructions are to configure a processor to obtain the first depth map from a memory location associated with a short-range camera.

25. The at least one non-transitory computer-readable medium of claim 21, wherein the one or more instructions are to configure a processor to:
    determine a second set of depth gradient information based on a second depth map;
    determine a second threshold parameter corresponding to a second depth gradient value; and
    classify a surface based on the second set of depth gradient information and the second threshold parameter.

26. The at least one non-transitory computer-readable medium of claim 25, wherein the one or more instructions are to configure a processor to classify the surface as flat and are to generate an outline of the surface.

27. The at least one non-transitory computer-readable medium of claim 25, wherein the one or more instructions are to configure a processor to classify the surface as non-manmade.

28. The at least one non-transitory computer-readable medium of claim 25, wherein the one or more instructions are to configure a processor to obtain the first depth map from a memory location associated with a short-range camera and the second depth map from a memory location associated with a long-range camera.

* * * * *